United States Patent [19]
Smith et al.

[11] Patent Number: 5,906,544
[45] Date of Patent: May 25, 1999

[54] WASHER ASSEMBLY APPARATUS

[75] Inventors: Gregory A. Smith; Gregory W. Kiser, both of Tiffin, Ohio

[73] Assignee: The National Machinery Company, Tiffin, Ohio

[21] Appl. No.: 08/991,200

[22] Filed: Dec. 16, 1997

[51] Int. Cl.[6] .................................................. B23P 19/08
[52] U.S. Cl. .............................. 470/49; 470/50; 470/3; 470/4; 470/165; 470/177; 470/178; 470/180; 29/783
[58] Field of Search .............................. 29/771, 783, 786, 29/793, 794, 525.02; 470/2, 3, 4, 48, 49, 50, 164, 165, 177, 178, 180

[56] References Cited

U.S. PATENT DOCUMENTS

| | | | |
|---|---|---|---|
| 3,012,258 | 12/1961 | Schott et al. | 470/50 |
| 3,120,770 | 2/1964 | Hoyt | 470/177 |
| 3,533,115 | 10/1970 | Meerendonk | 470/164 |
| 3,564,693 | 2/1971 | Auernhammer | 29/771 |
| 3,568,229 | 3/1971 | Moore et al. | 470/50 |
| 3,622,039 | 11/1971 | Lindstrom | 470/4 |
| 5,616,082 | 4/1997 | Kobetsky | 470/3 |

*Primary Examiner*—Joseph J. Hail, III
*Assistant Examiner*—Ed Tolan
*Attorney, Agent, or Firm*—Pearne, Gordon, McCoy & Granger LLP

[57] ABSTRACT

A high speed apparatus for assembling washers on headed parts such as bolt blanks, wherein individual washers are mechanically positively placed and seated onto individual blanks. The apparatus includes a linear transfer mechanism for progressively shifting the blanks through successive stations at which a washer is first placed on the end of a blank, is then "stuffed" axially along the shank of the blank, and is then positively abutted with the head. Various movements of the washers and blanks are effected by individual servomotors that greatly simplify the complexity of the apparatus, provide timing/stroke flexibility, and independent control.

21 Claims, 8 Drawing Sheets

WASHER ASSEMBLY APPARATUS

BACKGROUND OF THE INVENTION

The invention relates to methods and apparatus for automatically assembling washers and bolts.

PRIOR ART

It is common practice to assemble washers on headed blanks and then roll threads on the shanks so that the threads permanently capture the washers on the shank. Typically, blank heading equipment and threading equipment are capable of operating at speeds well in excess of the actual rate at which known automatic washer assembly devices work. While some washer assembly equipment is claimed to operate at high speed, the actual assembly rate in parts-per-minute can be substantially less than the claimed theoretical high speed. This shortfall is typically due to washer and blank feeding difficulties that stem from the traditional way these parts are handled. In prior art assembly equipment, vibratory and/or gravitational forces are commonly used to move the parts through the equipment and to effectuate an assembly. These vibratory and gravitational forces are inherently limited and, consequently, inhibit reliable high speed assembly motion.

SUMMARY OF THE INVENTION

The invention provides a method and apparatus for assembling washers and blanks together with positive motion control of both the washer and the blank so that essentially 100% efficiency is achieved at relatively high operational speeds. As disclosed, supplies of washers and blanks are put in respective queues. An individual blank and washer are each separated from their associated queue and positively moved by mechanical instrumentalities along converging and then overlapping paths. In the illustrated embodiment, the blank is moved by a linear transfer mechanism through a series of spaced assembly stations. The washer is moved onto the tip of the blank at one station and is thrust or "stuffed" along the length of the blank's shank at a subsequent station. Once the washer is collared around the shank tip, the transfer mechanism moves both the blank and the washer from station-to-station along the linear assembly path.

Various movements of the assembly instrumentalities are advantageously developed by individual high-speed servomotors that are operated by a controller that monitors the transfer cycle of the apparatus. The servomotors afford convenient timing and stroke flexibility for the independent movements of the assembly instrumentalities as well as independent control required during random blank and/or washer feed on/off situations.

DESCRIPTION OF THE PREFERRED EMBODIMENT

Figure 1:
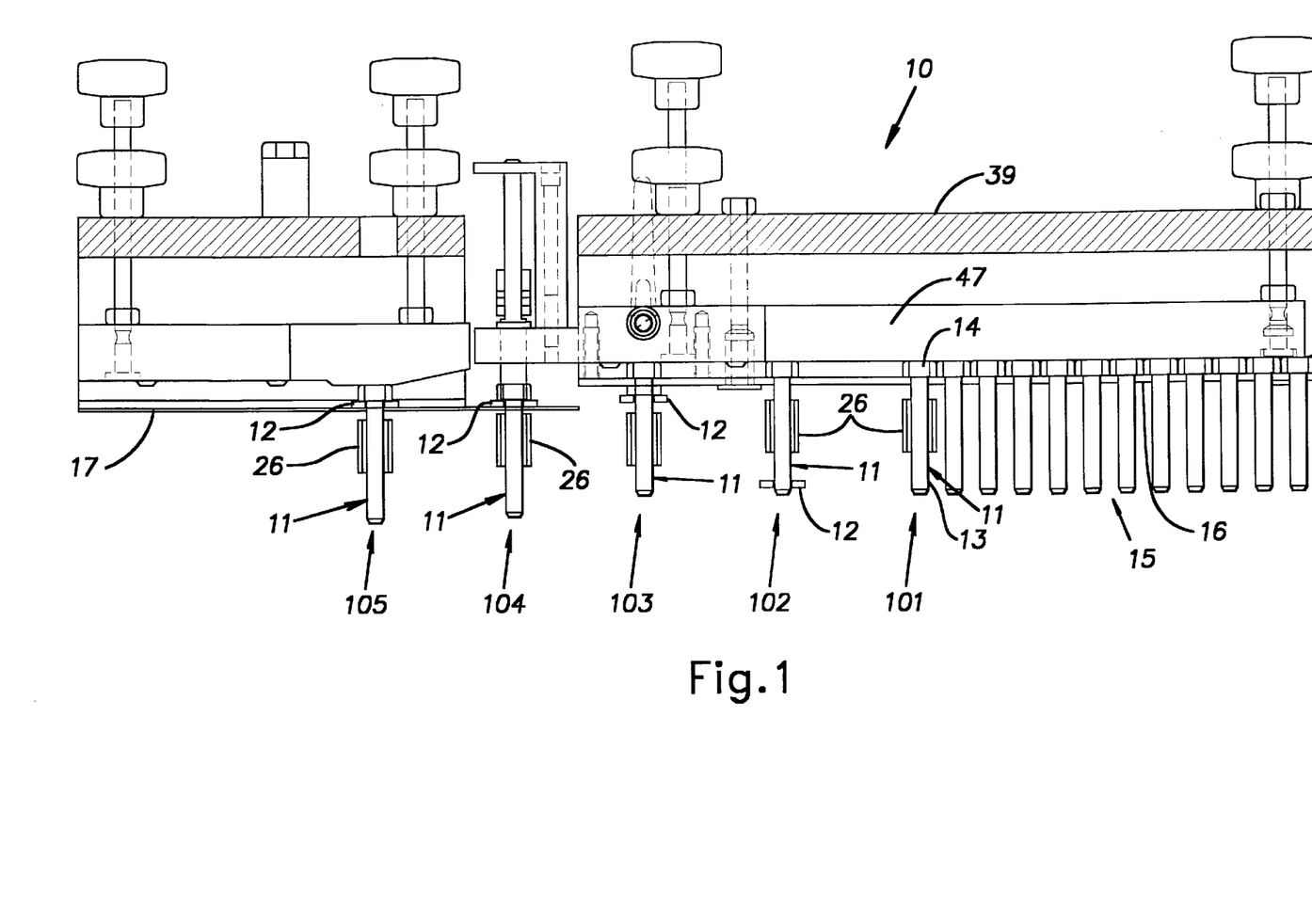
FIG. 1 is a somewhat schematic drawing of a linear path through which blanks and washers are sequentially moved by a linear transfer mechanism and in which a blank and washer are progressively assembled in the apparatus of the invention.
Figure 2:
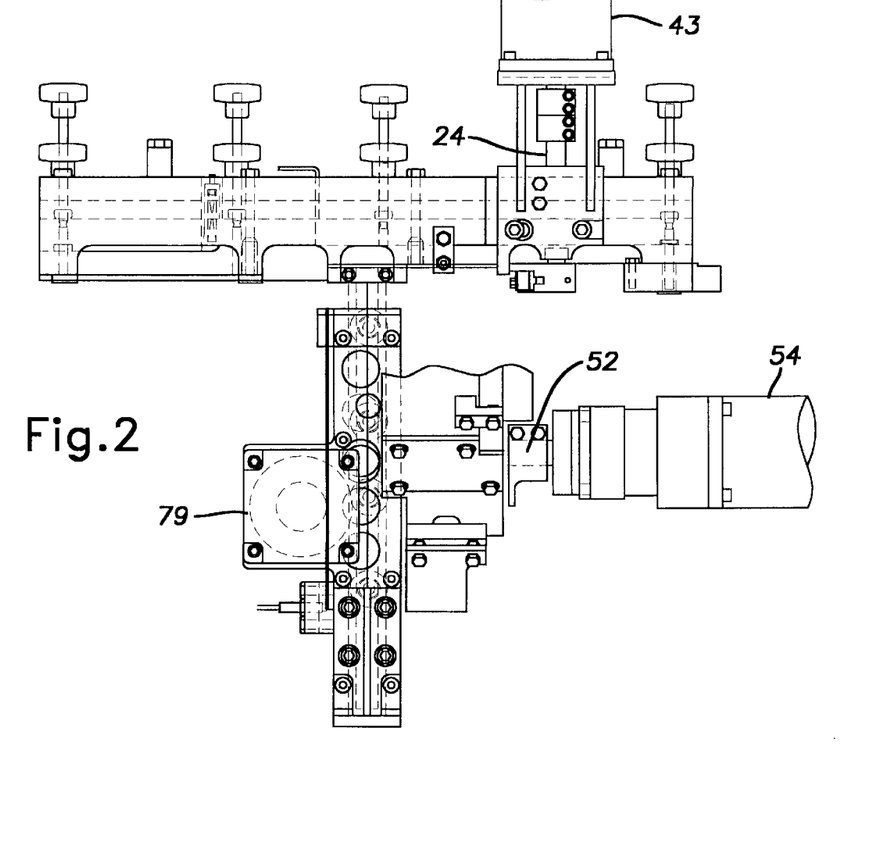
FIG. 2 is a somewhat schematic elevational view of the washer assembly apparatus.
Figure 3:
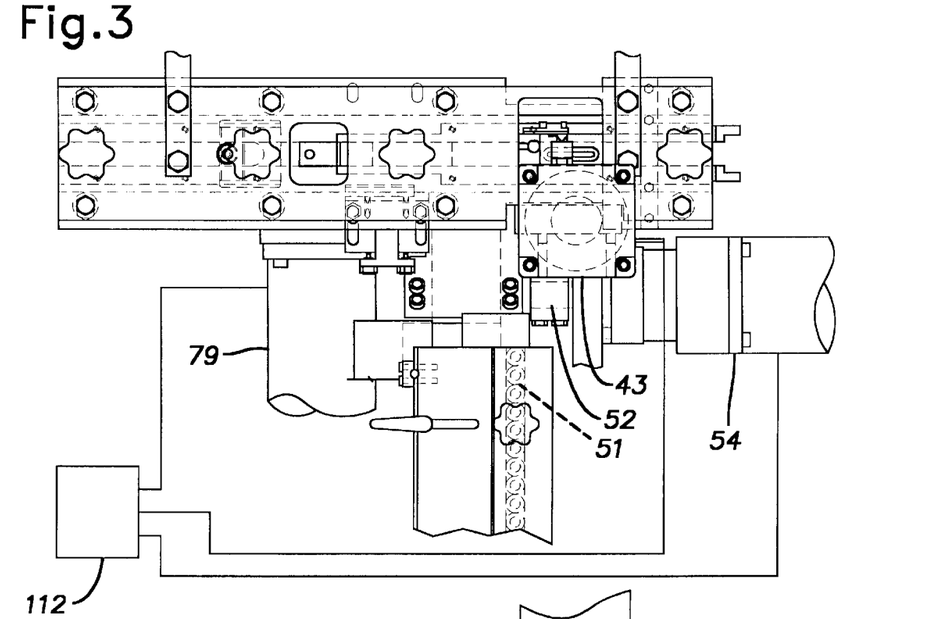
FIG. 3 is a somewhat schematic plan view of the apparatus.

With reference to the drawings and particularly now to FIG. 1, blanks 11 and washers 12 are automatically assembled in an apparatus 10. The term "blank" is used to cover unthreaded workpieces having cylindrical shanks 13 and enlarged heads 14 that become bolts when threaded The term "blank" as used herein is also intended to cover other elongated headed articles including already threaded bolts, screws and the like. The washers 12 typically have a generally circular bore and a generally circular outer periphery concentric with the bore and, most commonly, are either flat or conical. The washers can have other known specialized configurations. The assembly of washers and blanks is accomplished as more fully explained below, with the blanks first being separated from a queue 15 and then being linearly transferred through successive stations designated 101, 102, 103, 104 and 105. The blanks 11 move through the apparatus 10 while they are, for the most part, suspended from their heads 14 on parallel tracks 16, 17.

Figure 4:
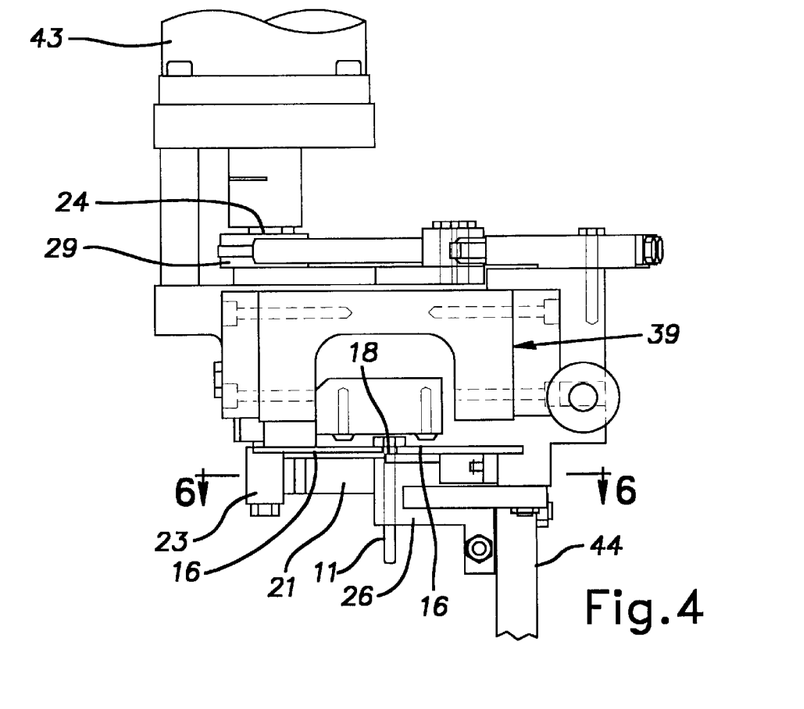
FIG. 4 is a schematic sectional elevational view of the apparatus at a first station where blanks are separated from a supply queue.
Figure 5:
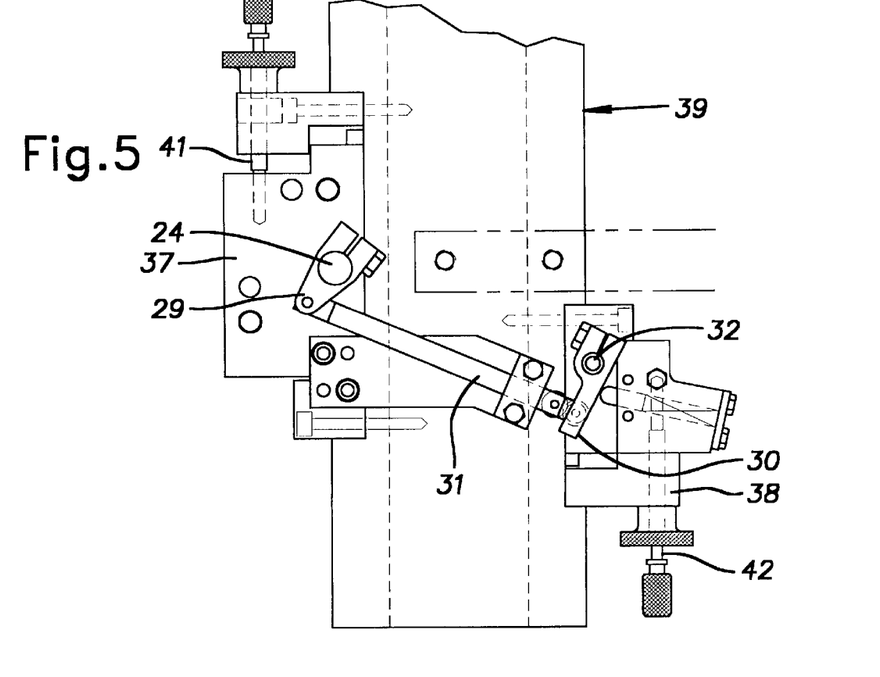
FIG. 5 is a fragmentary plan view of the first station of the apparatus.
Figure 6:
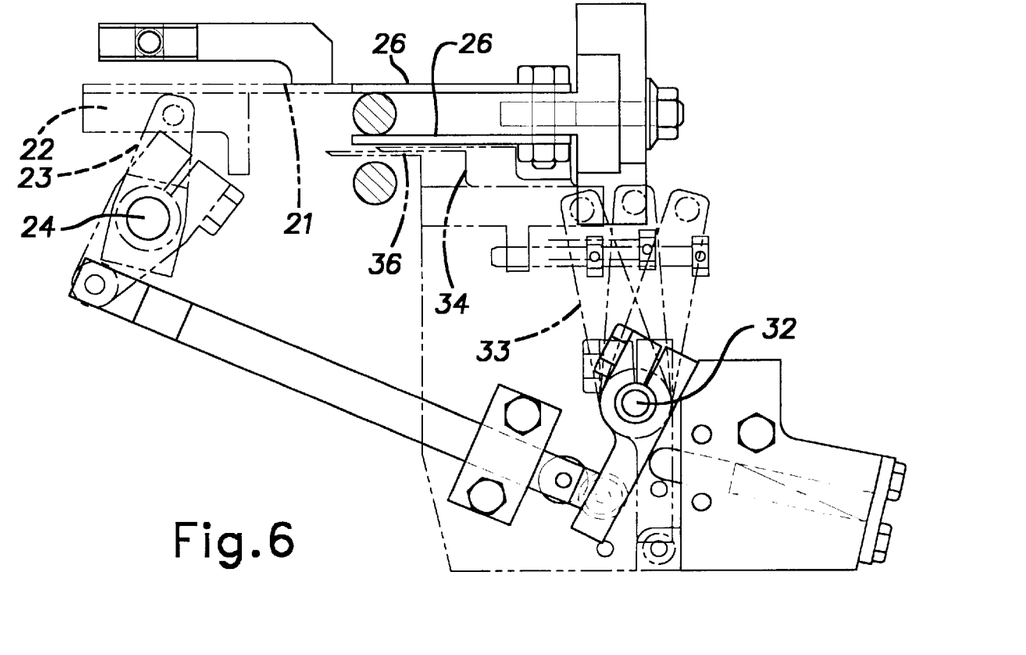
FIG. 6 is a view similar to FIG. 5 taken at the plane 6—6 indicated in FIG. 4.

FIG. 1 illustrates, somewhat schematically, how the blanks 11 are progressively transferred along the tracks 16, 17 from station-to-station 101–105 and the stages of assembly of a washer 12 to each blank. FIGS. 4 and 5 somewhat schematically show the elevational and plan views, respectively, of a blank separator station 101 of the apparatus 10. FIG. 6 is a sectional plan view of the separator station 101. With particular reference to FIGS. 4 through 6, blanks 11 supplied from a vibratory bowl, known in the art, or from another source, form the queue 15 on spaced parallel, horizontal tracks 16. The space in between the tracks 16 is selected to allow these tracks to straddle the shank 13 of the blanks while supporting the blanks at the underside of their heads 14. The tracks 16 thus form a path or slot 18 for passage therethrough of the blank shank 13.

A stop blade 21 carried on a block 22 pinned to the free end of a lever 23 that rocks on a vertical axis with a shaft 24 selectively stops blanks from moving along the tracks 16 when disposed in the position indicated in FIG. 6 where it extends horizontally across a major part of the diameter of a blank shank 13. The stop blade 21 cooperates with a pair of transfer fingers 26, discussed in greater detail below. The stop blade 21 operates in the plane of a downstream transfer finger 26 and this finger can be notched to receive the adjacent end of the stop blade. Pivotal movement of the lever 23 in a counter-clockwise direction in FIG. 6 retracts the blade 21 completely from the path of the shanks 13 along the tracks 16. As shown in FIG. 5, the shaft 24 has a second lever 29 fixed to it adjacent its upper end. The second lever 29 is coupled to a follower lever 30 on the opposite side of the blank path by a push rod 31. The follower lever 30 is fixed to a vertical shaft 32 that rocks a lever 33 (FIG. 6) adjacent a lower end of the shaft. The lever 33 has its free end connected to a block 34 on which is fixed an interrupter blade 36. It will be understood that when the stop blade 21 is in the path of the blanks 11 along the tracks 16, the interrupter blade 36 is out of such path and vice versa. The position of the shafts 24 and 32, blades 21, 36 and related parts can be adjusted longitudinally of the track 16 to account for changes in the diameter of the blanks by moving respective mounting blocks 37, 38 longitudinally of a housing 39, carrying the tracks 16, 17 through respective adjustment screws 41, 42.

The pivot shaft 24 is driven back and forth through a limited angle by a servomotor 43, the operation of which is discussed below. The interrupter blade 36 serves in the manner of an escapement to isolate the bias force of the queue from the blank 11 at the first station 101 positioned against the stop blade 21. The servomotor 43, under control of the controller 112 discussed below, can hold in a position with the interrupter blade 36 extended, thereby blocking the path of blanks 11. This function provides a method to control blank feed on/off which subsequently controls washer feed on/off. The stop blade 21 arrests a blank at the first station 101 so that it can be embraced by the first pair of transfer fingers 26. A transfer device comprises a set of arms 44 fixed on a common operating round shaft 46 and with a spacing between adjacent arms 44 equal to the distance between adjacent stations 101–105. The bar 46 is mounted parallel to the tracks 16, 17 on supports that permit it and the transfer arms 44 to pivot about its longitudinal axis and to reciprocate longitudinally. During each machine cycle, a transfer drive box, in which suitable rotary cams or like devices known in the art are powered by a suitable motor, causes the transfer shaft 46 to pivot and the transfer fingers 26 on the arms 44 to move generally radially in and out of straddling relation with the blanks 11 at respective stations and to move axially in translation back and forth to move the arms 44 and fingers 46 between adjacent stations 101 through 105 in a cyclical manner at a selected machine cycle speed and with desired relative timing. The transfer fingers 26 are relatively simple metal plates fixed to a respective arm 44. There are a pair of similar transfer fingers 26 and arms 44 associated with successive stations 102 through 105.

It will be understood that the transfer arms 44 and fingers 26 move in unison; this movement repeats on a machine cycle basis and involves sequential motion radially into the path of the blanks to capture a blank between pairs of fingers 26, motion longitudinally along the path of the tracks 16, 17 to move a blank from one station to the next station, motion radially away from the path to release the blank at this next station and, finally, motion longitudinally of the path in a reverse direction to return the fingers to their original station.

It will be understood that the transfer fingers 26, at the first station 101 at the proper time are caused to swing with the shaft 46 into a position where they straddle the blank shank 13 and thereafter move in translation with the shaft 46 parallel to the track 16 to move the blank 11 from the first station to the second station 102. At this second station 102, a blank 11 is firmly held in place by a restraining bar 47 that restrains the blanks from moving vertically upwardly. It will be understood that the lower ends of the shanks 13 of the blanks 11 remote from the heads 14 are free of the tracks 16, 17 and are unobstructed.

Figure 7:
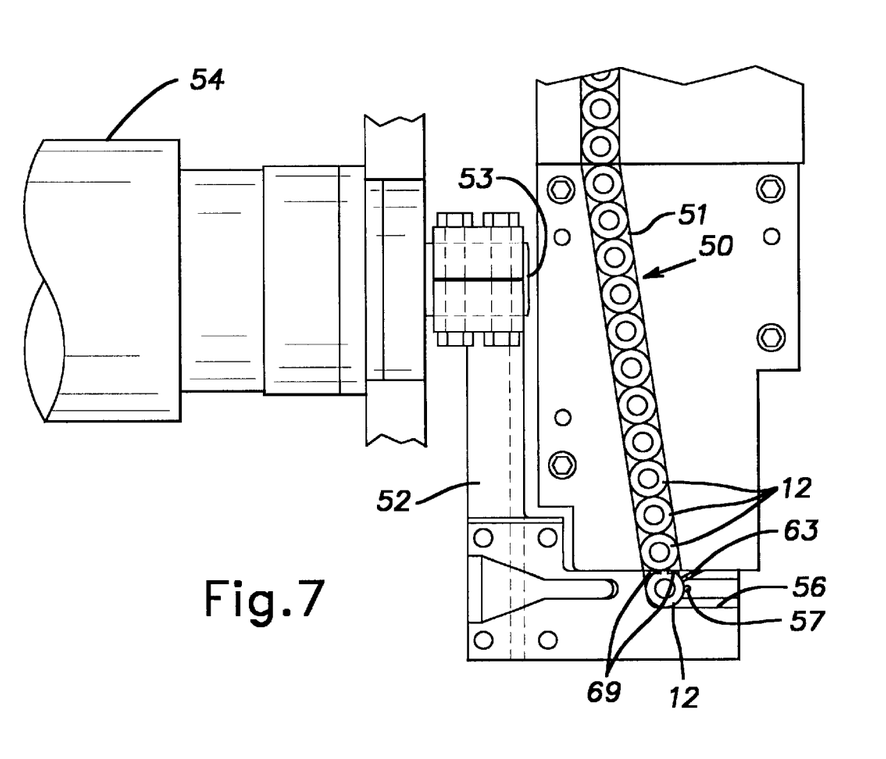
FIG. 7 is a projected view of a washer queue supply chute and washer flipper arm.
Figures 8, 9:
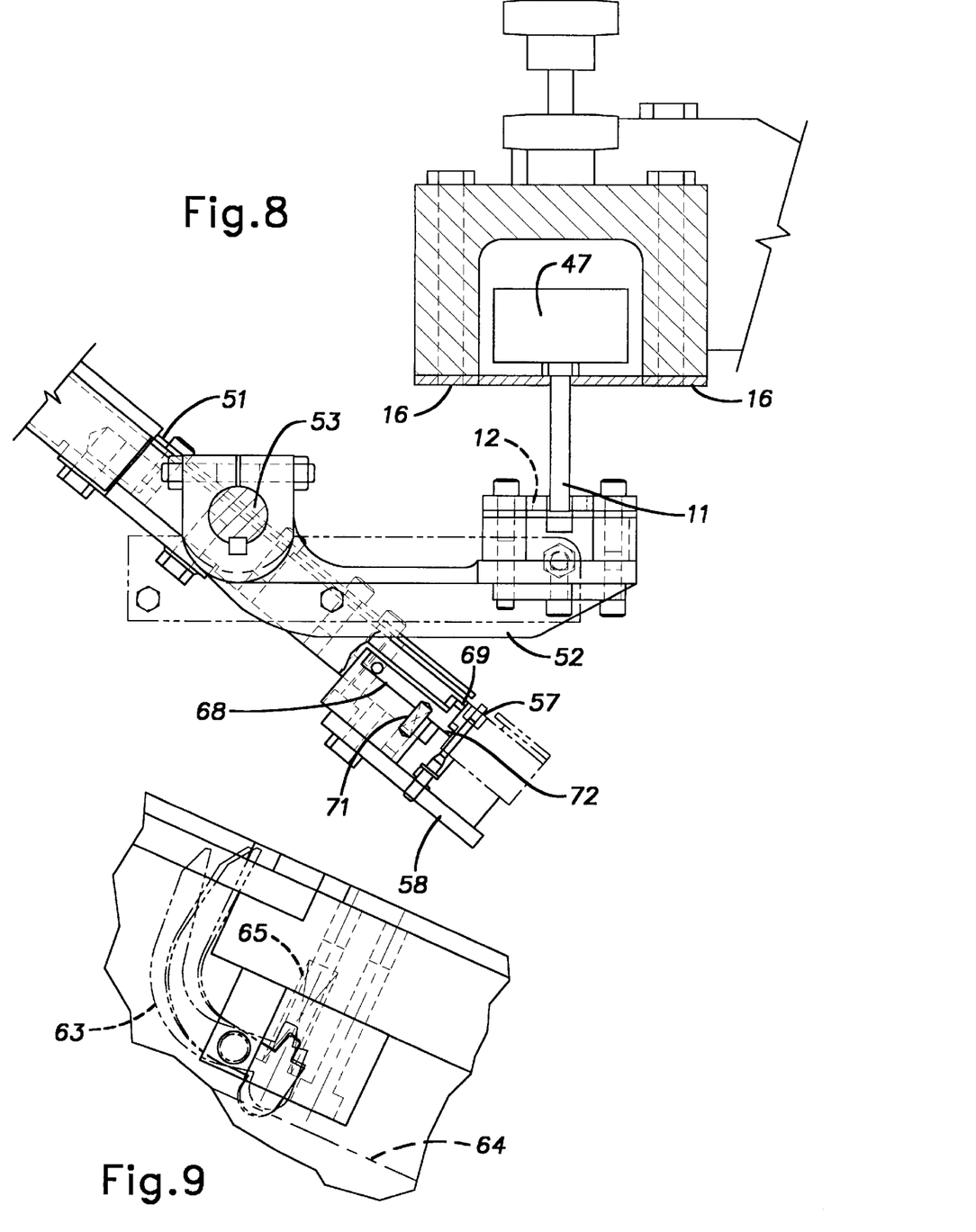
FIG. 8 is a fragmentary view, taken in the direction of the path of movement of the blanks, of a washer flipper.
FIG. 9 is an enlarged fragmentary view of a part of the flipper showing a washer control element.

Washers 12 supplied, for example, by a vibratory bowl or other source, form a queue 50 in edge-to-edge contact on an inclined chute or track 51 (FIGS. 7 and 8). One by one, the washers 12 are received from the chute 51 onto a flipper arm 52 and are then raised by the arm onto the lower end of the shank 13 at the second station 102. The flipper arm 52 has a right angle profile when viewed in the plane of the chute 51 (FIG. 7) where it is in a washer receiving position. The flipper arm 52 swings about a horizontal axis of a shaft 53 of a servomotor 54 back and forth through an angle of about 40°. The axis of the shaft 53 is parallel to the tracks 16. A slot 56, capped by a plate (not shown) receives a washer 12 from the chute 51 as indicated in FIG. 7. The washer 12 is biased towards the slot 56 by gravity due to the incline of the chute 51 and by a suitably directed air stream The washer flipper arm 52 is shown in its upper delivery position in FIG. 8. In the lower washer receiving position of the flipper arm 52, a pin 57 (FIG. 8) carried in the arm prevents a washer 12 from travelling forwardly, i.e. parallel to the direction parts are transferred, along the slot 56. When the flipper arm 52 lifts toward the solid line position in FIG. 8, the pin 57 is free of a stationary plate 58 associated with the chute 51 so that a spring is able to retract the pin from the slot 56. At the same time, when the flipper arm 52 lifts from the washer receiving position, a bell crank lever 63, illustrated in FIG. 9 carried on the flipper arm, is freed from a retracted position that results from engagement with a surface 64 fixed relative to the chute 51 and is caused by a spring 65 to releasably restrain the washer in the receiving point of the flipper arm slot 56. The bell crank lever 63 is yieldably biased to the washer restraining position by the spring 65.

A washer stop lever 68 (FIG. 8) with two upstanding fingers 69 (FIG. 7) is biased by a spring 71 to a position when the flipper arm 52 is lifted where the fingers stop the movement of additional washers 12 through the chute 51. In its down or washer receiving position, the flipper arm 52 bears on a tab 72 at the end of the lever 68 to retract the fingers 69 from the path of the washers through the chute 51 into the arm slot 56.

When actuated by the servomotor 54, the flipper arm 52 transports a washer 12 in an arc from the receiving point at the end of the chute 51 to a point where the washer is slipped over the lower end of a shank 13 at the second station 102. The presence or absence of a blank 11 at the second station 102 is detected by a suitable sensor, such as a photodetector sensing the head of the blank, communicating with the controller 112. The controller 112 actuates the flipper servomotor 54 to place a washer on the end of a blank 11 only if a blank is detected in this station. If no blank 11 is present, the flipper arm 52 under the control of a controller 112 will hold in its washer receiving position. This is an example of the flexibility of the apparatus derived from the independent operation of the various servomotors. The slot 56 in the flipper arm 52 extends longitudinally or forwardly in a direction parallel to the motion of the blanks 11, along the track 16, produced by the transfer fingers 26 approximately half-way to the subsequent station 103. A washer raising or stuffer head 73 is situated at the subsequent station 103 and has a pair of spaced parallel arms 74 that extend longitudinally upstream of the path taken by the blanks to ends that are closely spaced to the downstream end of the flipper slot 56. This arrangement, with the flipper arm 52 in its upward position, permits a blank 11 to drag a washer 12, which encircles a lower end of its shank, along the slot 56 by overcoming the friction drag of the bell crank lever 63 and onto the parallel arms 74 of the stuffer head 73 when the blank is shifted longitudinally downstream by the transfer fingers 26 from the second to the third station 102, 103.

Figure 11:
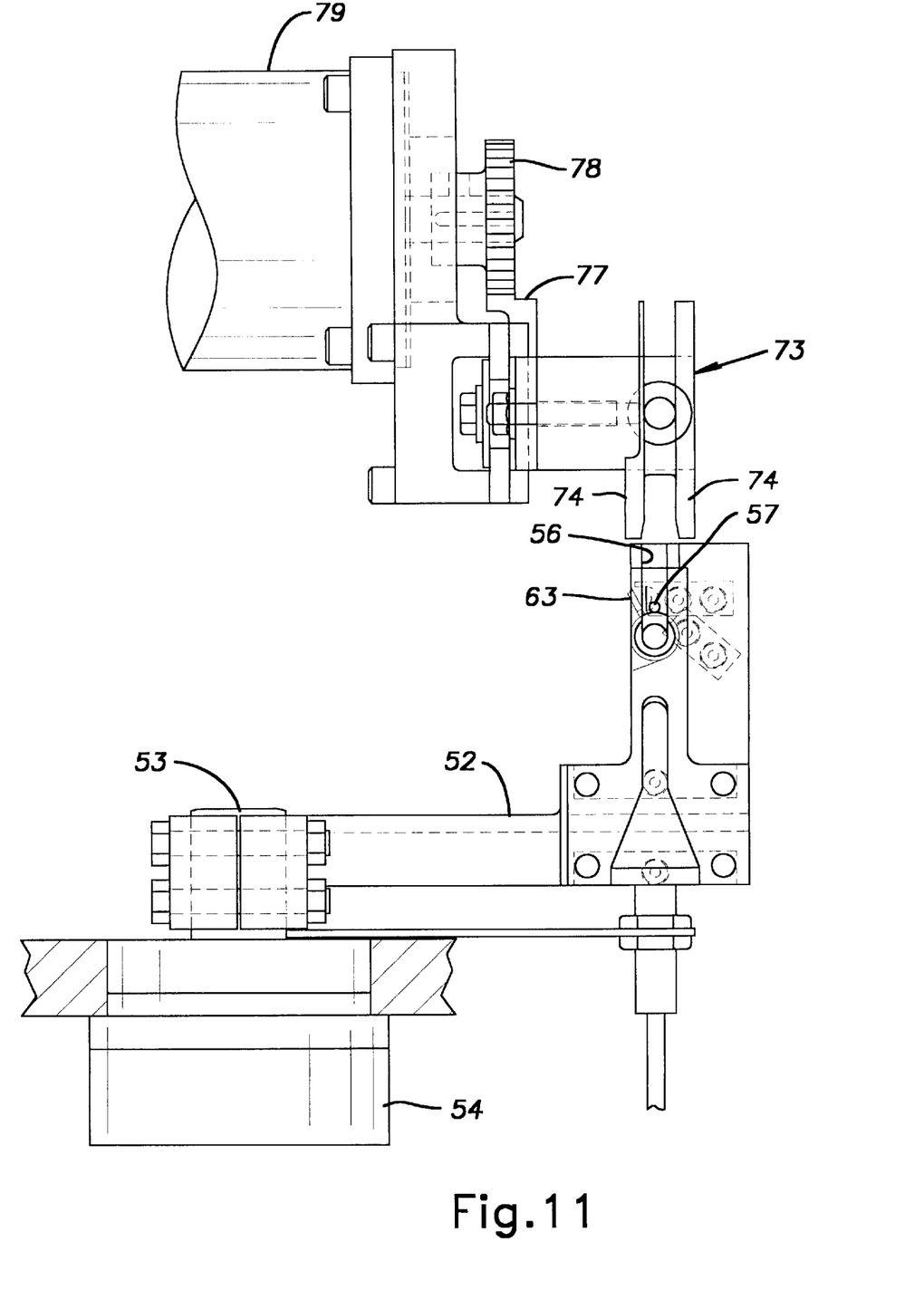
FIG. 11 is a plan view of the washer flipper and a washer stuffer head in respective positions for supporting a washer for movement between the washer receiving station and the washer stuffing station.

The stuffer head 73 is fixed on a vertical gear rack assembly 77 (FIG. 11). The gear rack assembly 77 and stuffer-head 73 are driven up and down at appropriate times by a pinion 78 rotated by a servomotor 79. With the blank 11 and washer 12 indexed to the center of the third station, the servomotor 79 raises the stuffer head 73 to lift the washer 12 from the level it was received from the flipper arm 52 to a level immediately below the tracks 16.

Figure 10:
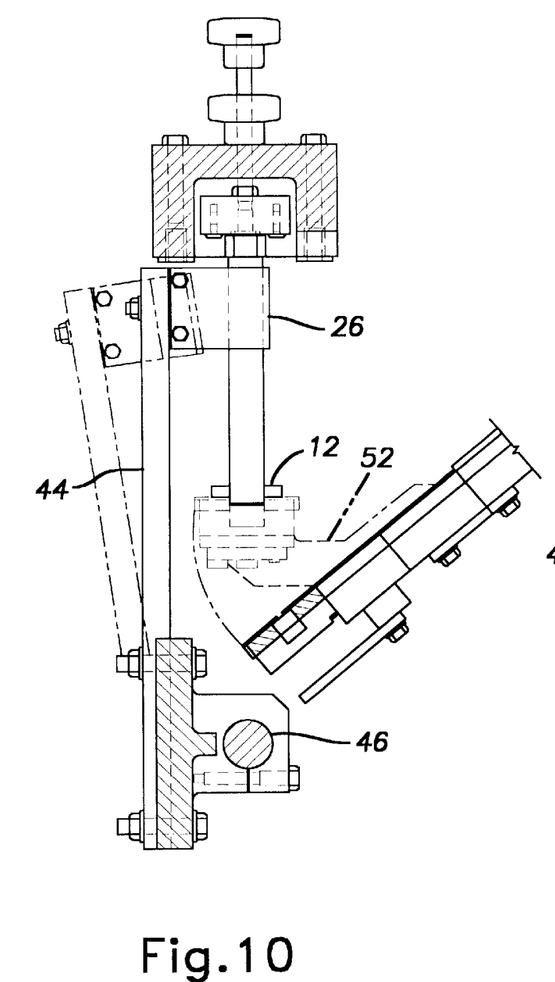
FIG. 10 is a fragmentary elevational view of the washer flipper and transfer fingers at a washer receiving station.
Figure 12:
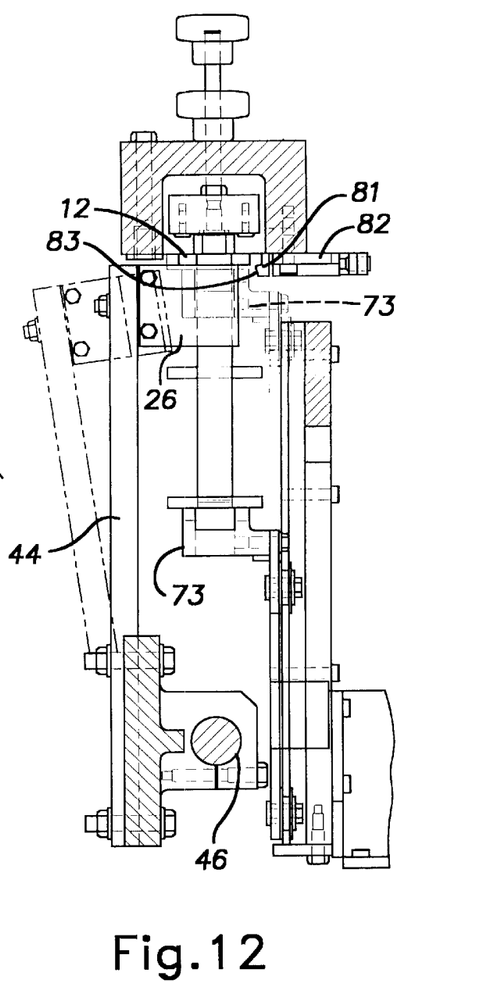
FIG. 12 is a fragmentary elevational view of a washer stuffer at a washer stuffer station.

FIGS. 8 and 10 illustrate the motion of the flipper arm 52 in raising a washer onto the lower end of a shank. FIG. 11 illustrates the relationship of the flipper arm 52 and stuffer head 73 that permits a washer to be dragged by a blank off of the flipper arm and onto the stuffer head 73. FIG. 12 illustrates the raising action of the stuffer head 73 for moving the washer from the lower end of the shank to a level immediately below the blank head 14.

In the next machine cycle, the transfer fingers 26 at the third station 103 are moved radially towards the blank 11 (FIG. 12) to capture the washer above the transfer fingers 26. With reference to FIG. 1, the tracks 16 are terminated midway between the third and fourth stations 103 and 104. Another set of spaced parallel tracks 17 are positioned below the level of the first tracks 16.

A washer catch 81 (FIG. 12) is formed by a block 82 that is cammed horizontally out of the path of a washer 12 being raised by the stuffer head 73 when the washer engages a camming surface 83 of the block 82. The washer catch block 82 is resiliently biased by a spring to the position illustrated in FIG. 12 and snaps back under the washer 12 when the washer is raised to a level just under the tracks 16. The washer catch 81 holds the washer at this elevation as the washer is initially moved over the second track set 17, thus ensuring that the washer is positioned above this second track set when it is moved, by the transfer fingers 26, into the fourth station 104.

Figure 13:
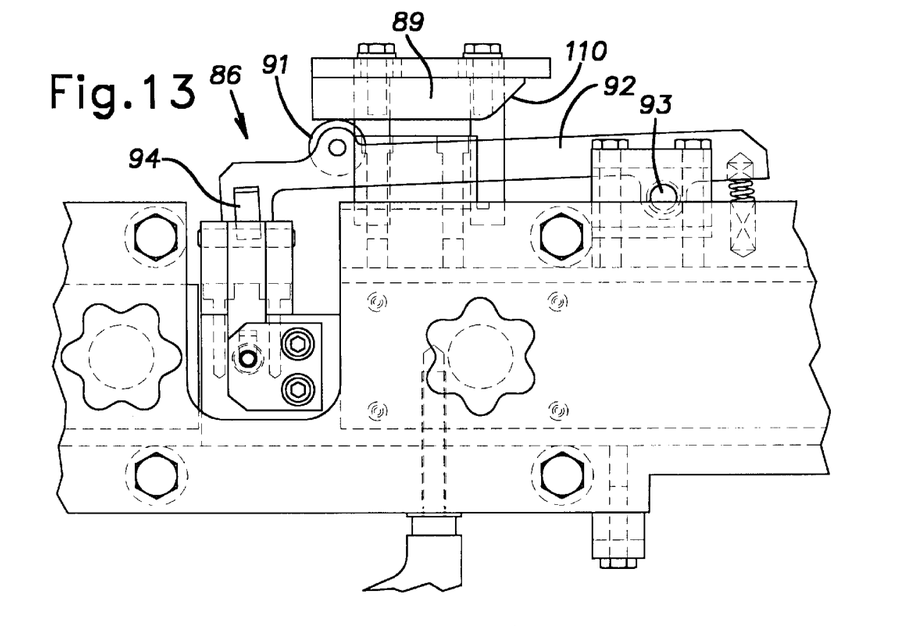
FIG. 13 is a somewhat schematic fragmentary plan view of the apparatus showing details of a head grip mechanism to positively drive the head of a blank and a washer into contact.
Figure 14:
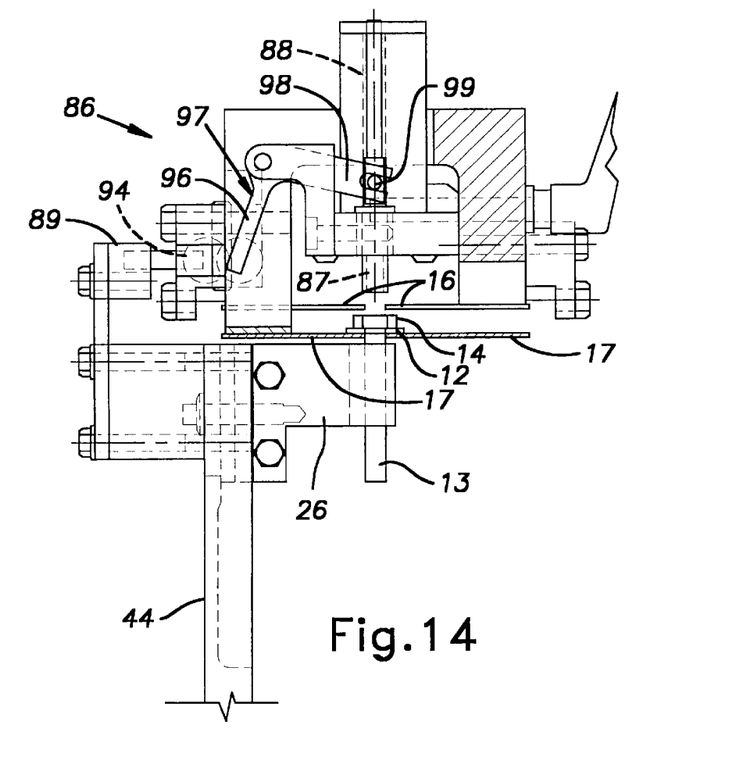
FIG. 14 is an elevational view of the mechanism of FIG. 13.

To achieve high speed operation, the blank 11 is forcibly lowered against the second track set 17 by a head grip mechanism 86 shown in FIGS. 13 and 14. The mechanism 86 includes a blank head gripping or hold down pin 87 that is biased downwardly by a compression spring 88. The vertical position of the pin 87 is controlled by a cam 89 carried on the transfer finger arm 44 associated with the transfer fingers 26 that move between the third and fourth stations 103 and 104, respectively. The cam 89 contacts a roller 91 on a lever 92 which pivots about a vertical pin 93. The free end of the lever 92 carries a second roller 94. The second roller 94 is adapted to push against an arm 96 of a bell crank lever 97. The bell crank lever 97 has another arm 98 that has its free end forked to couple with a transverse pin 99 fixed to the hold down pin 87. Initially, when the transfer fingers 26 are in at the station 103 and begin their shift along the tracks 16, 17 to the next station 104, the hold down pin 87 is held upwardly out of action. As will be understood from FIG. 13, as the transfer fingers 16 and cam 89 move towards the next station, a ramp surface 110 on the cam 89 allows the roller to back off so that the spring 88 can cause the hold down pin to contact the head 14 of a blank and drive the blank vertically or axially in the associated washer 12 until the washer is firmly held by the head against the tracks 17. Thus, the final assembly motion of the blank 11 and washer 12 is positively accomplished through the force of the spring 88, rather than simply by gravity, so that high speed, reliable operation can be achieved. The presence or absence of a washer 12 can be sensed with a laser, for example, gaging the stroke of the hold down pin 87 thereby enabling 100% on-line inspection.

When the washer is pressed against the tracks 17 by the blank head as just described, the assembly of the blank and washer is completed. From this last station 105, the blank and washer assembly can be conveyed to a subsequent work station where it can be roll threaded, for example.

The various servomotors 43, 54, 79 are operated at appropriate times in a machine cycle by the controller 112 that monitors the cycling of the transfer drive box by way of a shaft resolver or the like. This arrangement is particularly advantageous because the controller 112 can be programmed to produce any desired timing (i.e. instantaneous displacement, velocity and acceleration) and/or stroke independently in each of the servomotors. As previously mentioned, the controller can stop blank feed or washer feed as required. This can accomplish a so-called "soft stop" where parts in the apparatus are allowed to be fed out by the transfer box operating the transfer mechanism and at the same time discontinuing the supply of blanks and washers.

The washer feed components including the chute 51 and washer flipper 52 are mounted on a bracket frame system which is adjustable vertically with respect to the parts associated with the tracks 16, 17 and the blank transfer to adjust for different lengths of blanks. Such adjustment of the washer feed results in delivering a washer, when the flipper 52 is flipped up, to a point just on the lower end of a blank of a given length. The servomotor 79 operating the stuffer head 73 readily accounts for different lengths of blanks and different washer thicknesses. Adjustments and/or substitute parts can be used to accommodate different diameters of the blanks and thicknesses of the washers.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What we claim is:

1. Apparatus for assembling washers and blanks having heads and shanks comprising a path for passage of successive blanks, the path in progression including a supply, a washer receiving station, a washer stuffer station, and a discharge station, a path for passage of successive washers including a supply and a point intersecting the path of the blanks, a support for supporting blanks in the blank path through their heads while leaving the distal ends of their shanks unobstructed, a device for transporting successive washers along the washer path, the washer transporting device being arranged to move an individual washer onto the end of a shank distal from the blank head at the washer receiving station, support elements for supporting the individual washer on the distal end of a shank as the shank is moved from the washer receiving station to the washer stuffer station, and a washer stuffer device at the stuffer station for moving the individual washer on the shank from the distal end to a location adjacent its head while the blank remains stationary in its longitudinal direction.

2. Apparatus as set forth in claim 1, including a set of blank transfer elements for moving the blank between the washer receiving station and the washer stuffer station.

3. Apparatus as set forth in claim 2, wherein the blank transfer elements are formed by fingers that engage opposite sides of the shank.

4. Apparatus as set forth in claim 3, wherein the blank path between the receiving and stuffing stations is linear and the transfer fingers are supported for linear movement between the receiving and stuffing stations.

5. Apparatus as set forth in claim 1, wherein the washer support elements are arranged to allow the individual washer on the distal end of the blank to be moved by the blank between the washer receiving station and the washer stuffing station.

6. Apparatus as set forth in claim 1, including means for separating an individual blank from a queue of blanks at the blank supply station.

7. Apparatus as set forth in claim 1, including means for separating an individual washer from a queue of washers at the washer supply station.

8. Apparatus as set forth in claim 7, wherein the washer separating means includes an independently operable servomotor.

9. Apparatus as set forth in claim 1, wherein the washer transporting device comprises a pivotal arm.

10. Apparatus as set forth in claim 9, including an independently operable servomotor for pivoting said arm.

11. Apparatus as set forth in claim 1, wherein the washer supply includes a chute in which washers are arranged in a queue in edge-to-edge contact.

12. Apparatus as set forth in claim 11, wherein said washer chute is arranged on an incline and said blanks are supported at said stations with their shanks depending vertically.

13. A method of assembling washers having apertures on blanks having heads and shanks comprising supporting the blanks with the ends of their shanks distal from the heads free of obstruction, supporting the washers with their apertures free of obstruction, with a single blank supported stationarily in a washer receiving station moving a single washer onto the distal end of the shank of the single blank, moving the single blank and single washer in unison in translation to a washer stuffer station, sliding the single washer along the shank of the single blank to a point adjacent its head at the washer stuffer station while the blank remains stationary with reference to its longitudinal direction, and thereafter moving the blank and washer in unison in translation away from the washer stuffer station.

14. A method as set forth in claim 13, wherein the single blank and single washer are moved in a straight line of motion from said washer receiving station and said washer stuffer station.

15. A method as set forth in claim 13, wherein the single washer is moved onto the distal end of the shank by a pivotal carrier.

16. A method as set forth in claim 15, wherein the pivotal carrier receives the single washer from a queue supply at one location and pivots from said one location to a position adjacent the distal end of the single blank.

17. A method as set forth in claim 13, wherein the blanks are supplied one at a time to the washer receiving station from a queue of blanks.

18. A method as set forth in claim 17, wherein the blanks are moved, one at a time from the queue to the washer receiving station, by a transfer device that simultaneously moves a preceding blank from the washer receiving station to the washer stuffer station and the next earlier proceeding blank from the washer stuffing station.

19. A method as set forth in claim 17, wherein the blanks are separated from the queue by mechanical elements operated by an independent servomotor.

20. A method as set forth in claim 15, wherein the pivotal carrier is moved by an independent servomotor.

21. A method as set forth in claim 13, wherein the single washer at the stuffer station is moved axially along the shank by an independent servomotor.

* * * * *